United States Patent [19]
Matsuo et al.

[11] Patent Number: 5,467,004
[45] Date of Patent: Nov. 14, 1995

[54] MOTOR SPEED CONTROL APPARATUS FOR KEEPING THE SPEED OF THE MOTOR FIXED IN THE PRESENCE OF A DISTURBANCE TORQUE

[75] Inventors: Keisuke Matsuo, Neyagawa; Toshio Inaji, Minoo, both of Japan

[73] Assignee: Matsushita Electric Industrial Co., Ltd., Tokyo, Japan

[21] Appl. No.: 153,102

[22] Filed: Nov. 17, 1993

[30] Foreign Application Priority Data

Nov. 24, 1992 [JP] Japan ................................. 4-313066
Jan. 28, 1993 [JP] Japan ................................. 5-012288
Jan. 28, 1993 [JP] Japan ................................. 5-012289

[51] Int. Cl.⁶ .................................................. H02K 29/10
[52] U.S. Cl. ........................ 318/807; 318/432; 388/820
[58] Field of Search ............................ 318/798, 810, 318/807, 812, 611, 254, 432; 388/816, 820

[56] References Cited

U.S. PATENT DOCUMENTS

| | | | |
|---|---|---|---|
| 4,143,311 | 3/1979 | Lee | 318/611 |
| 4,360,767 | 11/1982 | Akiyama et al. | 388/816 |
| 5,144,210 | 9/1992 | Sato | 318/812 |
| 5,298,841 | 3/1994 | Katayama et al. | 318/254 |

Primary Examiner—William M. Shoop, Jr.
Assistant Examiner—John W. Cabeca
Attorney, Agent, or Firm—Wenderoth, Lind & Ponack

[57] ABSTRACT

A motor control apparatus controls a motor speed according to a detected period of a frequency signal whose frequency is in proportion to the motor speed and drives the motor so as to keep its speed fixed according to a drive signal. The motor control apparatus includes a disturbance torque observer receptive to the drive signal and the detected period which produces a estimated disturbance signal corresponding to a conversion of a disturbance torque into an electrical signal. A comparator produces a period error signal which is a difference between the detected period and a desired period. An arithmetic unit produces the control signal in accordance with the period error signM. A torque correcting unit produces the drive signal by adding the estimated disturbance signal to the control signal.

17 Claims, 19 Drawing Sheets

MOTOR SPEED CONTROL APPARATUS FOR KEEPING THE SPEED OF THE MOTOR FIXED IN THE PRESENCE OF A DISTURBANCE TORQUE

BACKGROUND OF THE INVENTION

1. Field of the Invention

This invention relates to a motor control apparatus for controlling the speed of a motor. More particularly, the invention relates to a motor control apparatus capable of eliminating the influence of a disturbance torque.

2. Description of the Prior Art

A control apparatus of a capstan motor or a drum motor used in a VCR must keep the speed of the motor fixed. FIG. 11 is a schematic block diagram of a conventional speed control loop of such a motor. In FIG. 11, element 100 is a capstan motor or a drum motor used in a VCR; element 110 is a frequency generator for generating a frequency signal FG, whose frequency is in proportion to the speed of the motor 100; element 120 is a period detector for detecting the period of the frequency signal FG; element 130 is a comparator for calculating a period error $\Delta T_{FG}$, which is the difference between an inputted desired period $T_r$ and the detected period $T_{FG}$ from the period detector 120; element 140 is an arithmetic unit for calculating a control signal c which is, for example, equal to $(K_p+K_i/S) \cdot \Delta T_{FG}$, wherein $K_p$ is a proportional gain, $K_i$ is an integral gain and s is a Laplacian; element 150 is a motor drive circuit for supplying the motor 100 with a drive current $I_a$ according to the control signal c.

In the control loop of FIG. 11, a disturbance torque, which is caused by tape transportation, motor torque ripple, external vibration and so on, is applied to the motor 100. The influence of the disturbance torque appears as a fluctuation in the motor speed. Even though a fluctuation in speed is produced by the disturbance, the overall control loop acts in a direction to reduce the fluctuation in speed. The higher the gain of the control loop, the greater the degree to which the disturbance is suppressed. However, there is a limit to the gain, for the overall system will fall into an oscillatory state if the control loop gain is made too high. In other words, if the disturbance torque is large, the fluctuation in motor speed cannot be suppressed sufficiently because the degree of suppression cannot be raised.

Recently, various motor control apparatus, which are capable of suppressing the influence of the disturbance torque by using a disturbance torque observer, have been proposed. For example, one of such apparatus is described in "A Robust Decentralized Joint Control Based on Interference Estimation," Proc. IEEE Int. Conference, Robotics and Automation, vol. 1, 326–331 (1987). In such apparatus, a disturbance torque observer estimates the disturbance torque applied to a motor according to the speed of the motor and the drive command fed to the motor. The drive command is corrected in accordance with the estimated disturbance torque from the disturbance torque observer. As the result of the correction, the influence of the disturbance torque is cancelled and a fluctuation in the motor speed is eliminated.

However, as shown in FIG. 11, a motor control apparatus used in a VCR keeps the speed of the motor fixed by reducing to zero the difference between the desired period $T_r$ and the detected period $T_{FG}$. Therefore, the conversion of the detected period into a speed is necessary for applying the conventional disturbance torque observer to a motor control apparatus used in a VCR. This conversion makes the hardware or an operation sequence of a software program used for the motor control complicated. Furthermore, it is difficult to realize a process of estimating the disturbance torque according to the conventional disturbance torque observer with such a processor as used in a VCR for home-use, whose performance characteristics are not very high, because the constitution of the conventional torque observer is complex.

SUMMARY OF THE INVENTION

Accordingly, an object of the present invention is to provide a motor control apparatus having a simpler disturbance torque observer, which is suitable for a VCR and which makes it possible to sufficiently suppress a fluctuation in motor speed due to a disturbance torque.

To attain the foregoing object, a motor control apparatus in accordance with the present invention comprises: a frequency generator for generating a frequency signal whose frequency is proportional to the speed of the motor; a period detector for detecting the period of the frequency signal; a comparator for calculating a period error signal which is the difference between a desired period and the detected period detected by the period detector; an arithmetic unit for calculating a control signal in accordance with the period error signal; a motor drive circuit for supplying the motor with electrical power according to a drive signal; a disturbance torque observer for calculating an estimated disturbance torque signal from the detected period signal and the drive signal, the estimated disturbance torque signal being a conversion of the disturbance torque applied to the motor into an electrical signal; and, a torque correcting unit for calculating the drive signal by adding the control signal to the estimated disturbance torque signal.

The disturbance torque observer utilizes the detected period signal directly as its input signal. Therefore, the conversion of the detected period into the motor speed isn't necessary for the operation of the disturbance torque observer. In addition, the disturbance torque observer calculates the conversion value of the disturbance torque as an electrical signal directly without the estimation of the disturbance torque itself. As a result, the configuration of the disturbance torque observer according to the present invention is simplified in comparison with that of a conventional disturbance torque observer.

Consequently, a motor control apparatus provided by the present invention can be easily applied to a conventional motor control apparatus which keeps a motor speed fixed by reducing to zero the difference between a detected period of the frequency signal and a desired period. Furthermore, since the torque correcting unit acts to cancel the influence of the disturbance torque, a motor control apparatus in accordance with the present invention makes it possible to sufficiently suppress a fluctuation in motor speed due to a disturbance torque.

DESCRIPTION OF THE PREFERRED EMBODIMENTS

The following is a description of the first embodiment of this invention.

Figure 1A:
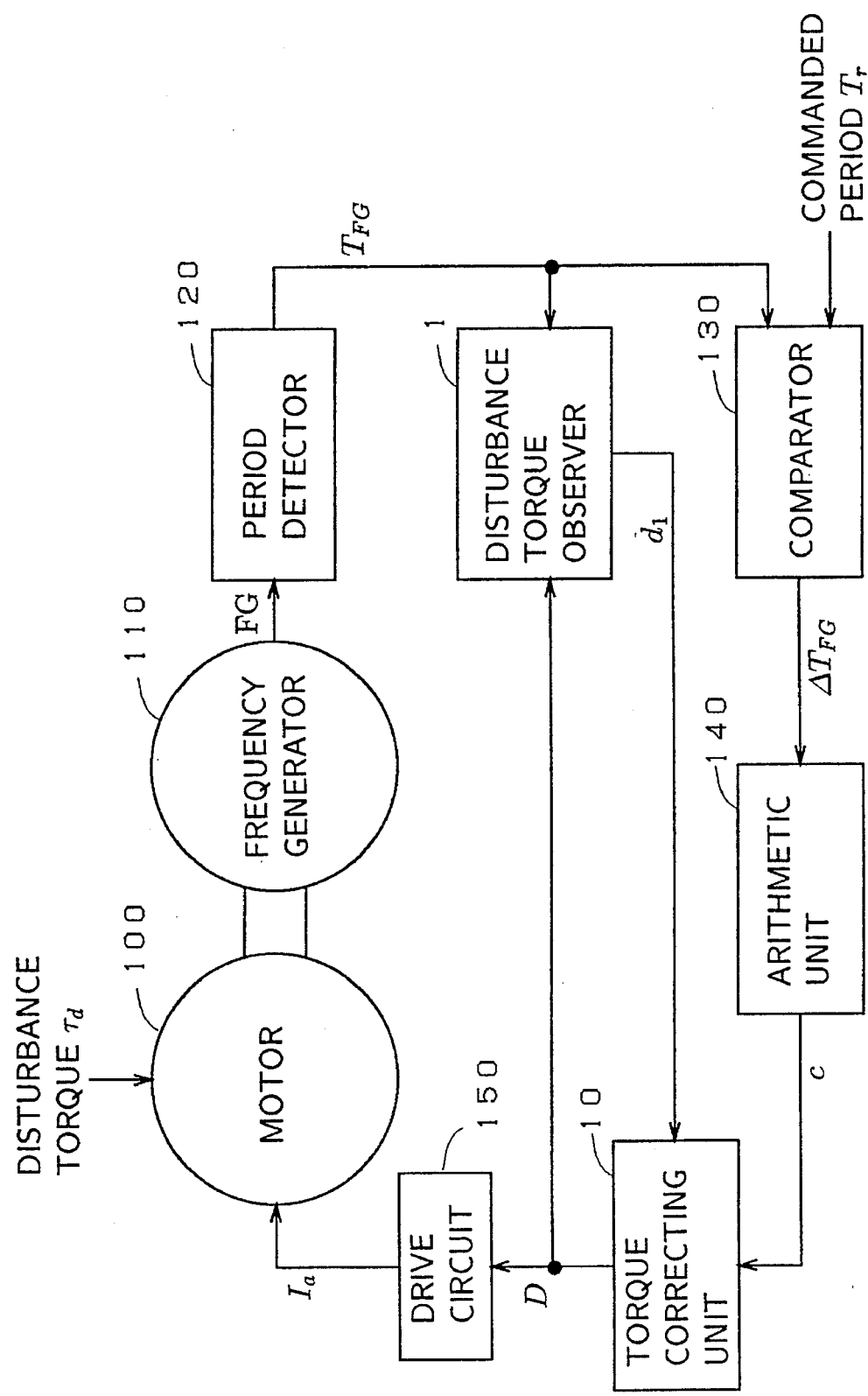
FIG. 1A is a schematic block diagram of a first embodiment of a motor control apparatus according to the present invention.

In FIG. 1A, element 100 is a motor; element 110 is a frequency generator for generating a frequency signal FG, whose frequency is proportional to the speed of the motor 100; element 120 is a period detector, which detects the period of the frequency signal FG; element 130 is a comparator for calculating a period error $\Delta T_{FG}$, which is the difference between a desired period $T_r$ and the detected period $T_{FG}$ outputted by the period detector 120; element 140 is an arithmetic unit for calculating the control signal c in accordance with the period error $\Delta T_{FG}$; element 150 is a motor drive circuit for supplying the motor 100 with a drive current $I_a$ according to the drive signal D; element 1 is a disturbance torque observer for calculating a estimated disturbance torque signal $d_1$; element 10 is a torque correcting unit for correcting the control signal c according to the estimated disturbance torque $d_1$ and for outputting the result as the drive signal D.

The first embodiment of this invention shown in FIG. 1A operates as follows: A disturbance torque $\tau_d$ is applied to the motor 100. The period detector 120 detects the period of the frequency signal FG generated by the frequency generator 110. The comparator 130 subtracts the detected period signal $T_{FG}$ from a desired period $T_r$ (constant value) and outputs the result of the subtraction as the period error $\Delta T_{FG}$. The arithmetic unit 140 calculates the control signal c, which is, for example, calculated so as to be equal to $(K_p+K_i/s) \cdot \Delta T_{FG}$, wherein $K_p$ is a proportional gain, $K_i$ is an integral gain and s is a Laplacian. The torque correcting unit 10 adds the control signal c to the estimated disturbance signal $d_1$ outputted by the disturbance torque observer 1 and outputs the result of the addition as the drive signal D. The operation of the disturbance torque observer 1 in calculating the estimated disturbance signal will be explained later. The drive circuit 150 supplies the drive current $I_a$ to the motor 100 according to the drive signal D.

According to these processes, the speed of the motor 100 is controlled so as to reduce the period error to zero. In other words, the speed of the motor 100 is kept fixed. If the estimated disturbance signal is zero, these processes are substantially same as those of the conventional motor control apparatus shown in FIG. 11.

Figure 1B:
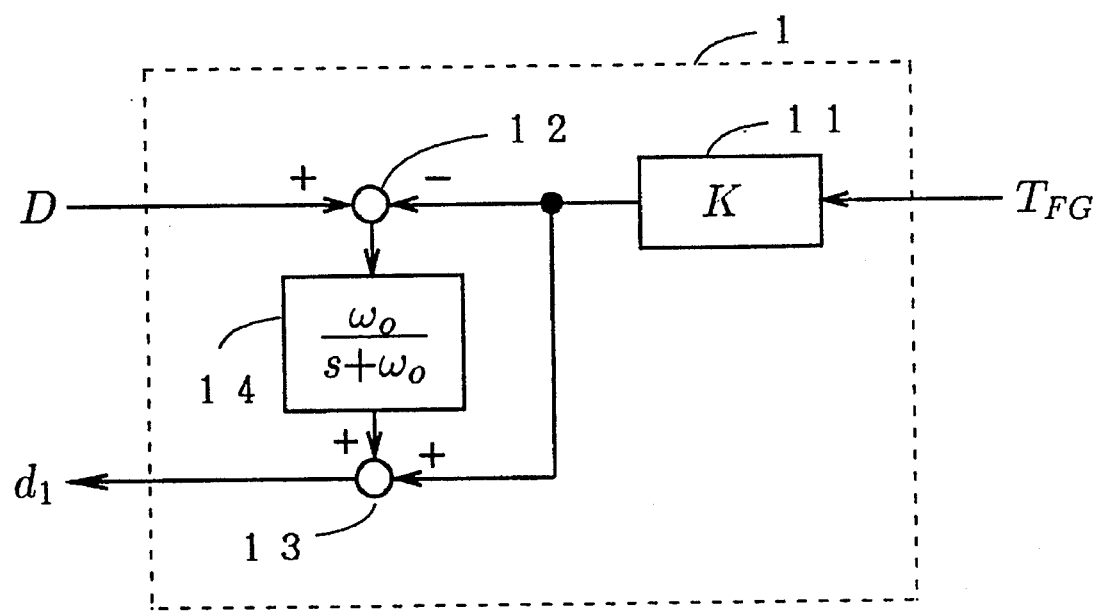
FIG. 1B is a block diagram of a disturbance torque observer according to the first embodiment.

In FIG. 1B, element 11 is a gain setting unit for setting the gain to a constant K; element 12 is a first adder; element 13 is a second adder and element 14 is a first-order low-pass filter, whose transfer function is: $w_o/(s+w_o)$, wherein $w_o$ is a cut-off angular frequency. The constant K is represented as follows:

$$K = \omega_o \cdot \frac{J}{K_t} \cdot \frac{1}{K_{amp}} \cdot \frac{2\pi}{Z} \cdot \frac{1}{T_r^2} \quad (1)$$

wherein J represents the inertia of the motor 100, $K_t$ is a torque constant, $K_{amp}$ is the gain of the drive circuit 150, and Z is the number of the pulses per revolution generated by the frequency generator 110.

The disturbance torque observer 1 shown in FIG. 1B acts as follows: The detected period $T_{FG}$ from the period detector 120 is multiplied by the constant K. The result of the multiplication is subtracted from the drive signal D by the first adder 12. The output of the first adder is supplied the low-pass filter 14. The second adder 13 adds the output of the low-pass filter 14 to the output of the multiplication and outputs the result of the addition as the estimated disturbance signal $d_1$.

As mentioned above, the estimated disturbance signal $d_1$ is added to the control signal c by the torque correcting unit 10. By this torque correction, the influence of the disturbance torque $\tau_d$ is cancelled and a fluctuation in the speed of the motor 100 is eliminated.

The following is an explanation of the effect of suppressing the influence of the disturbance torque.

One can obtain the following equation indicating the relationship between the estimated disturbance $d_1$, the detected period $T_{FG}$ and the drive signal D from the block diagram shown in FIG. 1B:

$$d_1 = \frac{\omega_o}{s+\omega_o} \cdot \left( D + \frac{J}{K_t} \cdot \frac{1}{K_{amp}} \cdot \frac{2\pi}{Z} \cdot \frac{1}{T_r^2} \cdot sT_{FG} \right) \quad (2)$$

where $d_1$, D and $T_{FG}$ are s-domain functions.

One can then assume that x(t) represents the time-domain function of the detected period and that y(t) represents the time-domain function of the angular speed of the motor 100. Namely, One assumes as follows:

$$T_{FG}=L\{x(t)\}w=L\{y(t)\} \quad (3)$$

where L represents a Laplace transform and w represents the s-domain function of the speed of the motor 100.

The relationship between z(t) and y(t) is as follows:

$$y(t)=\frac{2\pi}{Z} \cdot \frac{1}{x(t)} \quad (4)$$

Now, as the motor 100 is controlled so as to keep its speed fixed, the detected period x(t) is changing in the neighborhood of the desired period $T_r$ (constant value). Therefore, the time-differential of Eq. (4) when $x(t)=T_r$ is as follows:

$$\frac{dy}{dt}=-\frac{2\pi}{Z} \cdot \frac{1}{T_r^2} \cdot \frac{dx}{dt} \quad (5)$$

Taking the Laplace transform of both sides of Eq. (5) results in the following equation using Eq. (3):

$$s\omega=-\frac{2\pi}{Z} \cdot \frac{1}{T_r^2} \cdot s\, T_{FG} \quad (6)$$

Therefore, Eq. (2) becomes as follows using Eq. (6):

$$d_1=\frac{\omega_o}{s+\omega_o} \cdot \left( D-\frac{J}{K_t} \cdot \frac{1}{K_{amp}} \cdot s\omega \right) \quad (7)$$

On the other hand, the relationship between the disturbance torque $\tau_d$, the drive signal D and the speed w of the motor 100 is as follows:

$$\tau_d=K_t K_{amp} D-Jsw \quad (8)$$

where $\tau_d$ is an s-domain function.

Consequently, Eq. (7) becomes as follows using Eq. (8):

$$d_1=\frac{\omega_o}{s+\omega_o} \cdot \frac{1}{K_t} \cdot \frac{1}{K_{amp}} \cdot \tau_d \quad (9)$$

Eq. (9) means that the estimated disturbance signal $d_1$ is equal to the disturbance torque $\tau_d$ multiplied by the reciprocal of the torque constant $K_t$, the reciprocal of the gain of the drive circuit 150 and the transfer function of the low-pass filter 14. In other words, the estimated disturbance signal $d_1$ consists of low-frequency components of the conversion signal of the disturbance torque $\tau_d$ in a dimension of the control signal c.

Figure 11:
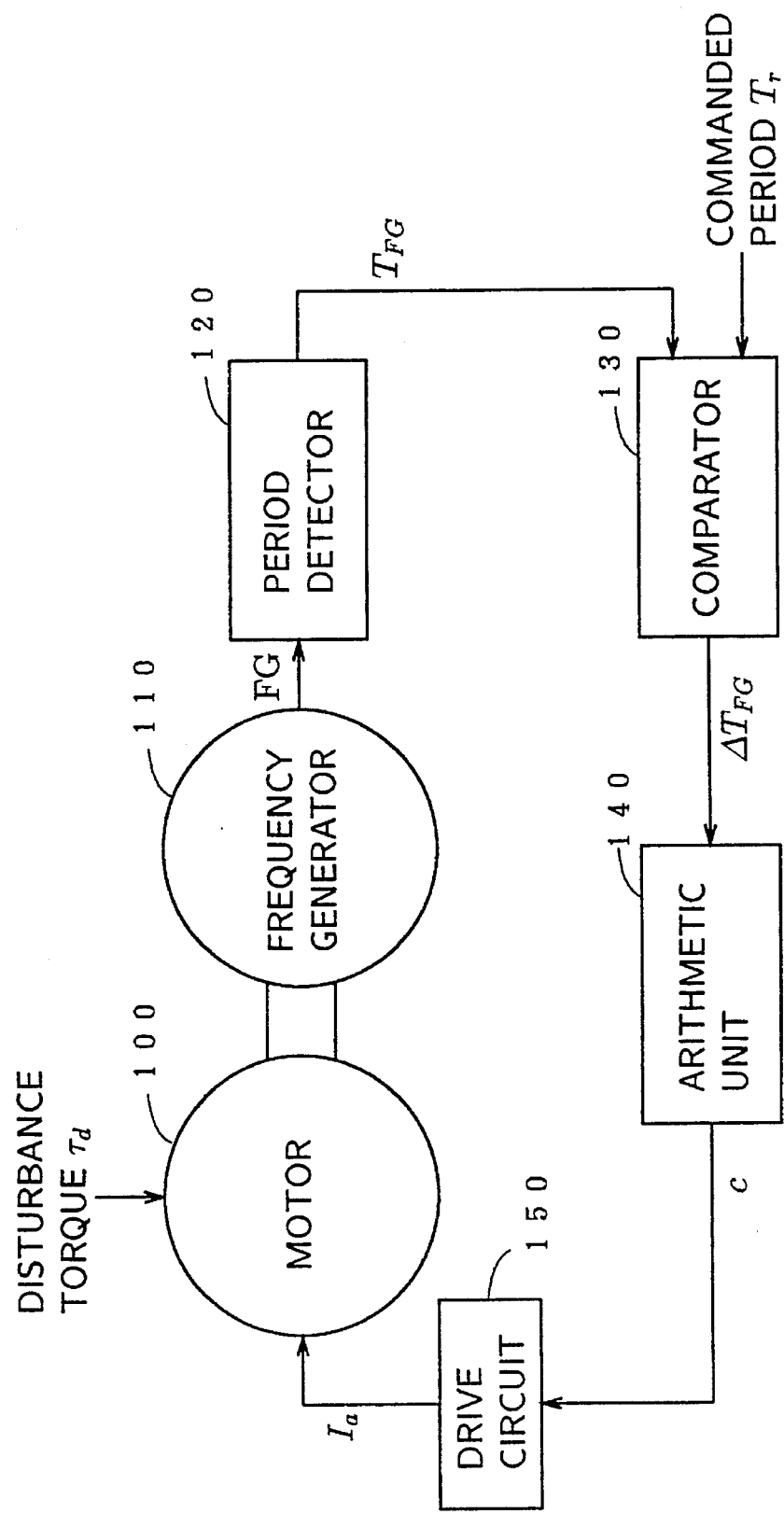
FIG. 11 is a block diagram of a prior art motor control apparatus used in a VCR.

Accordingly, the transfer function G(s) from the disturbance torque $\tau_d$ to the speed w of the motor 100 in FIG. 1A becomes as follows using Eq. (9):

$$\begin{aligned} G(s) &= \left( 1-\frac{\omega_o}{s+\omega_o} \right) G_c(s) \\ &= \frac{s}{s+\omega_o} G_c(s) \end{aligned} \quad (10)$$

where $G_c(s)$ represents the transfer function from the disturbance torque $\tau_d$ to the speed w in FIG. 11, which is a conventional motor control apparatus.

Consequently, the first term of the right side of Eq. (10), namely $s/(s+\omega_o)$, represents the effect obtained by the disturbance torque observer 1. This term represents the transfer function of the first-order high-pass filter, whose cut-off angular frequ-ency is $\omega_o$. This means that the disturbance torque observer 1 makes it possible to eliminate a fluctuation in the speed of the motor 100 due to a disturbance torque $\tau_d$, which has a frequency which is lower than $\omega_o/(2\pi)$.

According to a first embodiment of this invention, it is not necessary for the disturbance torque observer to convert the detected period into the motor speed, because the disturbance torque observer can utilize the detected period $T_{FG}$ directly as its input signal. In addition, the disturbance torque observer according to this invention has a simpler configuration than a conventional disturbance torque observer, because this observer is constituted so as to convert the disturbance torque $\tau_d$ into an electrical signal c directly without the determination of the actual disturbance torque $\tau_d$ itself. Therefore, it can be easily applied to a motor control apparatus to keep the speed of the motor fixed with respect to the period of the frequency signal. As the result, fluctuations in the motor speed can be eliminated without making the hardware or a software program for the motor control complicated.

A second embodiment of this invention is described below.

Figure 2A:
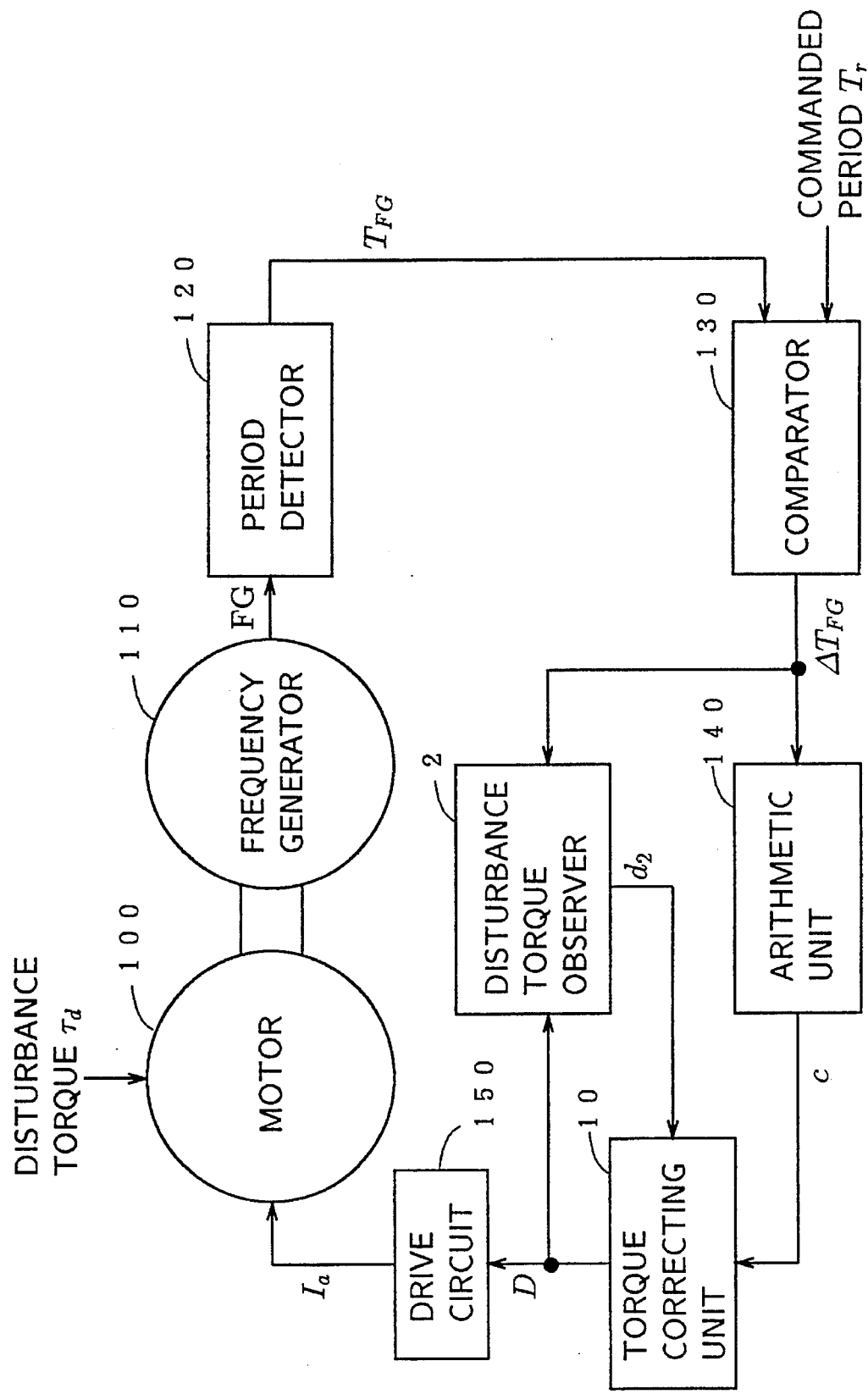
FIG. 2A is a schematic block diagram of a second embodiment of a motor control apparatus according to the present invention.

In FIG. 2A, element 2 is a disturbance torque observer according to the second embodiment. Since the other elements are same as those shown in FIG. 1A, a description thereof has been omitted.

Figure 2B:
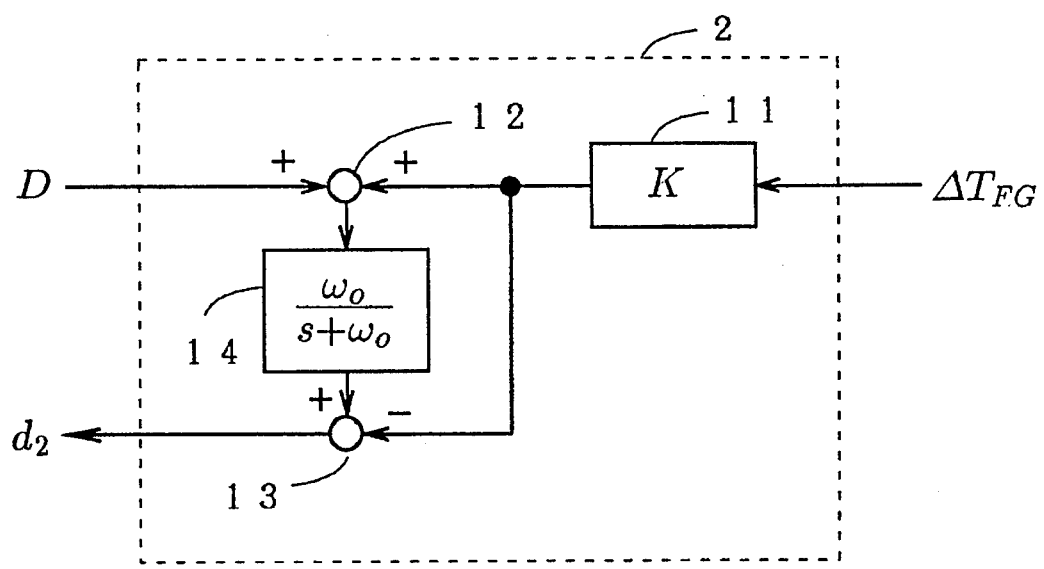
FIG. 2B is a block diagram of a disturbance torque observer according to the second embodiment.

In FIG. 2B, element 11 is a gain setting unit for setting a gain to a constant K; element 12 is a first adder; element 13 is a second adder and element 14 is a first-order low-pass filter, whose transfer function is: $w_o/(s+w_o)$. As shown in FIG. 2B, the configuration of the disturbance torque observer 2 is the same as that of the disturbance torque observer 1 shown in FIG. 1B. However, the disturbance torque observer 2 is different from the disturbance torque observer 1 in that it uses the period error $\Delta T_{FG}$ in place of the detected period $T_{FG}$. In other words, the disturbance torque observer 2 calculates the estimated disturbance signal $d_2$ according to the error signal $\Delta T_{FG}$ and the drive signal D.

The disturbance torque observer 2 shown in FIG. 2B operates as follows: The period error $\Delta T_{FG}$ outputted by the comparator 130 is multiplied by the constant K. The result of the multiplication is added to the drive signal D by the first adder 12. The output of the first adder is supplied the low-pass filter 14. The second adder 13 subtracts the output of the low-pass filter 14 from the result of the multiplication and outputs the result of the subtraction as the estimated disturbance signal $d_2$.

The estimated disturbance signal $d_2$ is added to the control signal c by the torque correcting unit 10. By this torque correction, the influence of the disturbance torque $\tau_d$ is cancelled and the fluctuation in the speed of the motor 100 is eliminated.

The following is an explanation of the effect of suppressing the influence of the disturbance torque.

One can obtain the following equation indicating the relationship between the estimated disturbance signal $d_2$, the error signal $\Delta T_{FG}$ and the drive signal D from the block diagram of FIG. 2B.

$$d_2=\frac{\omega_o}{s+\omega_o} \cdot \left( D-\frac{J}{K_t} \cdot \frac{1}{K_{amp}} \cdot \frac{2\pi}{Z} \cdot \frac{1}{T_r^2} \cdot s\Delta T_{FG} \right) \quad (11)$$

where $d_2$ and $\Delta T_{FG}$ are s-domain functions.

One can assume that w(t) represent the time-domain function of the period error. Namely, one can assume as follows:

$$\Delta T_{FG}=L\{w(t)\} \quad (12)$$

and the relationship between x(t) and w(t) is as follows:

$$w(t)=T_r-x(t) \quad (13)$$

In Eq. (13), since the desired period L is a constant value, the time differential of the both sides of Eq. (13) results in the following:

$$\frac{dw}{dt} = -\frac{dx}{dt} \quad (14)$$

On the other hand, as mentioned above, the relationship between the time differential of x and that of y is given by Eq. (5). Therefore, Eq. (14) becomes as follows using Eq. (5):

$$\frac{dw}{dt} = \frac{2\pi}{Z} \cdot \frac{1}{T_r^2} \cdot \frac{dy}{dt} \quad (15)$$

Taking the Laplace transform of both sides of Eq. (15) results in the following equation using Eqs. (3) and (12):

$$s\omega = \frac{2\pi}{Z} \cdot \frac{1}{T_r^2} \cdot s\Delta T_{FG} \quad (16)$$

Therefore, Eq. (11) becomes as follows using Eq. (16):

$$d_2 = \frac{\omega_o}{s + \omega_o} \cdot \left( D - \frac{J}{K_t} \cdot \frac{1}{K_{amp}} \cdot s\omega \right) \quad (17)$$

By making a comparison between Eqs. (2) and (11), it is obvious that the estimated disturbance signal $d_2$ is equal to the estimated disturbance signal $d_1$ outputted by the disturbance torque observer 1. Accordingly, the relationship between the estimated disturbance signal $d_2$ and the disturbance torque $\tau_d$ is represented by the same equation as Eq. (9).

From this, according to the second embodiment of this invention, one can obtain the same effect as that of the first embodiment. Furthermore, since the magnitude of the period error $\Delta T_{FG}$ is smaller than that of the detected period $T_{FG}$, the dynamic range of the disturbance torque observer 2 can be narrower than that of the disturbance torque observer 1.

The following is a description of the third embodiment of this invention, which is a modification of the second embodiment using a software servo arrangement.

The configuration of the third embodiment is same as that of the second one shown in FIG. 2A. In using a software servo arrangement, the operations performed by the period detector 120, the comparator 130, the arithmetic unit 140, the correcting unit 10 and the disturbance torque observer 2 are realized by using a processor which operates according to a software program stored in memory.

Figure 3:
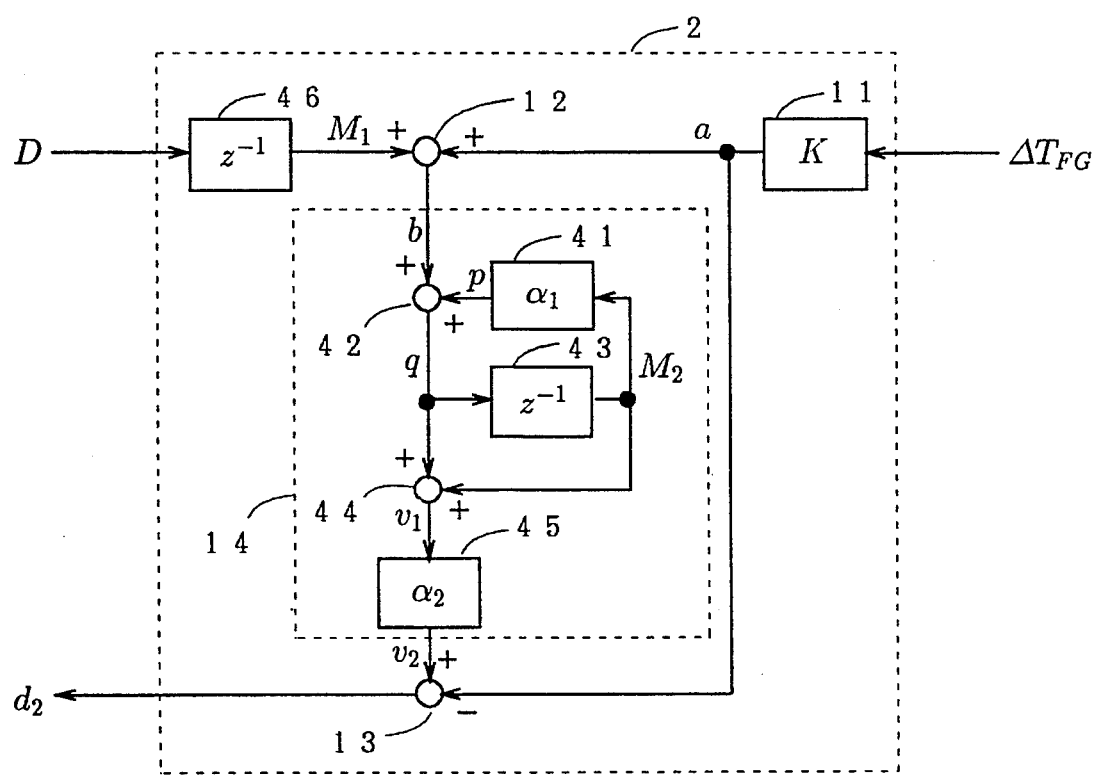
FIG. 3 is a block diagram of a disturbance torque observer according to a third or a fourth embodiment of the present invention.

FIG. 3 shows a block diagram of the disturbance torque observer 2 modified for use with a software servo, namely in which the low-pass filter 14 is digitally emulated.

In FIG. 3, element 41 is a gain setting unit for setting a gain to a constant $\alpha_1$; element 45 is a gain setting unit for setting a gain to a constant $\alpha_2$; elements 43 and 46 are delay units for effecting a delay of one sampling time $T_s$, and elements 42 and 44 are adders. The transfer function $Q_1(z)$ of the low-pass filter 14 is given by the following equation:

$$Q_1(z) = \frac{\alpha_2(1 + z^{-1})}{1 - \alpha_1 z^{-1}} \quad (18)$$

where constants $\alpha_1$ and $\alpha_2$ are as follows using the sampling time $T_s$:

$$\alpha_1 = \frac{2 - \omega_o T_s}{2 + \omega_o T_s} \quad (19)$$

$$\alpha_2 = \frac{\omega_o T_s}{2 + \omega_o T_s} \quad (20)$$

This transfer function $Q_1(z)$ is obtained by transforming the continuous transfer function of the first-order low-pass filter $Q(s) = w_o/(s + w_o)$ with an s–z transform as follows:

$$s = \frac{2}{T_s} \cdot \frac{1 - z^{-1}}{1 + z^{-1}} \quad (21)$$

As this transform is well-known, a description thereof has been omitted.

Figure 4A:
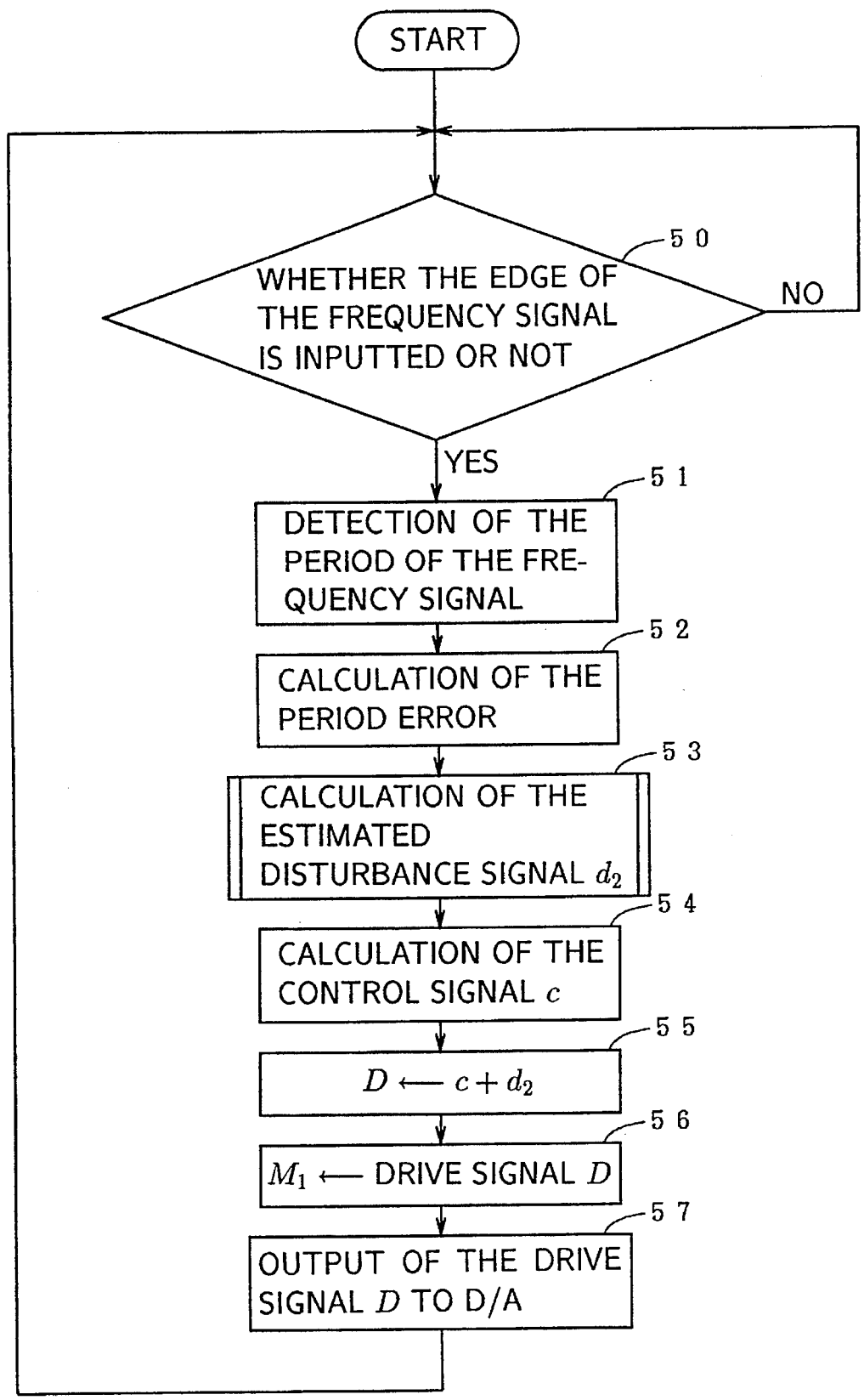
FIG. 4A is a flowchart illustrating the operation sequence of the third embodiment.
Figure 4B:
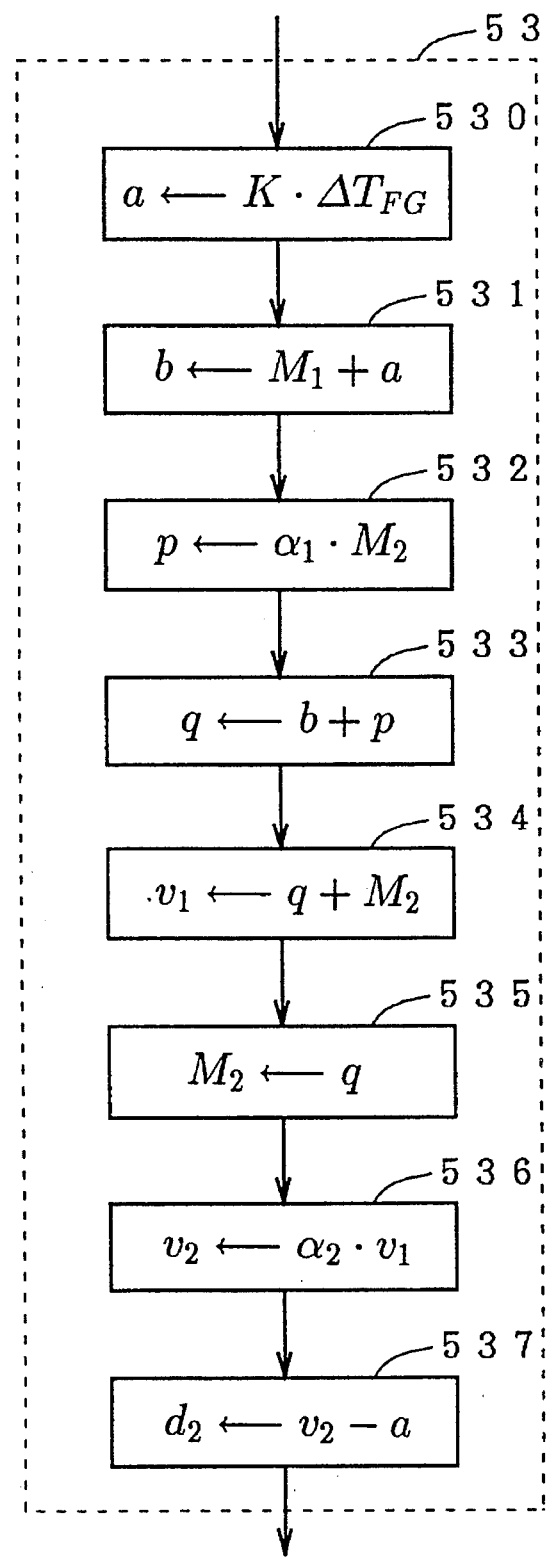
FIG. 4B is a detailed flowchart illustrating the operation sequence of the disturbance torque observer according to the third embodiment.

FIG. 4A is a flowchart illustrating the operation sequence of the third embodiment, and FIG. 4B is a detailed flowchart illustrating the operation sequence of the disturbance torque observer 2 shown in FIG. 3.

The block 50 determines whether or not the edge of the frequency signal FG has been inputted to the processor. If the edge has been inputted, the operation moves to the next block 51, and if not, the operation returns to the block 50. Namely, the operation of the block 50 is carried out repeatedly until the edge is inputted. The block 51 stores the time when the edge was inputted and calculates the detected period $T_{FG}$ from the difference between this input time and the last input time. This block 51 corresponds to the operation performed by the period detector 120 shown in FIG. 2A. The block 52 calculates the period error $\Delta T_{FG}$ by subtracting the detected period $T_{FG}$ from the desired period $T_r$. This block 52 corresponds to the operation performed by the comparator 130 shown in FIG. 2A. The block 53 calculates the estimated disturbance signal $d_2$ from both the period error $\Delta T_{FG}$ and the previously stored memory data $M_1$. This block 53 corresponds to the operation performed by the disturbance torque observer 2 shown in FIG. 3. The details of the operation of this block will be described later. The block 54 calculates the control signal c which is the result of servo compensation, for example, both proportional and integral compensation. This block 54 corresponds to the operation performed by the arithmetic unit 140 shown in FIG. 2A. Because how this compensation is realized using a software servo is well-known, the details thereof have been omitted. The block 55 calculates the drive signal D, which is obtained by adding the estimated disturbance signal $d_2$ to the control signal c. This block 55 corresponds to the operation performed by the correcting unit 140 shown in FIG. 2A. The block 56 stores the drive signal D in memory as the memory data $M_1$ which is used in the block 53 when the next edge of the frequency signal FG is inputted. This block 56 corresponds to the operation performed by the delay unit 46 shown in FIG. 3. At last, the block 57 provide a D/A (digital to analog) converter with the drive signal D. After the block 57, the operation returns to the block 50. The above operations are carried out repeatedly while being synchronized with the frequency signal FG.

On the other hand, the D/A converter provide the drive circuit 150 with a voltage according to the drive signal D. The drive circuit 150 supplies the drive current $I_a$ to the motor 100 according to this voltage. As the result, the speed of the motor 100 is controlled so as to reduce the period error to zero and is kept fixed.

The following is a description of the operation performed by the block 53.

As shown in FIG. 4B, the block 53 consists of the blocks 530–537. The block 530 calculates the digital data a which is the period error $\Delta T_{FG}$ multiplied by the constant K. This block 530 corresponds to the operation performed by the gain setting unit 11. The block 531 calculates the digital data b by adding the above mentioned memory data $M_1$ to the digital data a. This block 531 corresponds to the operation performed by the first adder 12. The block 532 calculates the distal data p which is the memory data $M_2$ multiplied by the constant $\alpha_2$, where $M_2$ has been previously stored in memory. This block 532 corresponds to the operation performed by the gain setting unit 41. The block 533 calculates the digital data q by adding the digital data b to the digital data p. This block 533 corresponds to the operation performed by the adder 42. The block 534 calculates the digital data $v_1$ by adding the above mentioned memory data $M_2$ to the digital data q. This block 534 corresponds to the operation performed by the adder 44. The block 535 stores the digital data $v_1$ in memory as the memory data $M_2$ for the blocks 532 and 534 when the next edge of the frequency signal is inputted. This block 535 corresponds to the operation performed by the delay unit 43 shown in FIG. 3. The block 536 calculates the digital data $v_2$ which is the digital data $v_1$ multiplied by the constant $\alpha_2$. This block 536 corresponds to the operation performed by the gain setting unit 45. At last, the block 537 calculates the estimated disturbance signal $d_2$ by subtracting the digital data a from the digital data $v_2$. This block 537 corresponds to the operation performed by the second adder 13.

According to the third embodiment of this invention, one can obtain the same effect as that of the second embodiment, because the disturbance torque observer 2 shown in FIG. 3 is configured so as to act in the same manner as that shown in FIG. 2A.

A fourth embodiment of this invention, which is a modification of the third embodiment so as to shorten the time lag due to the operation of the processor, is described below.

Figure 5A:
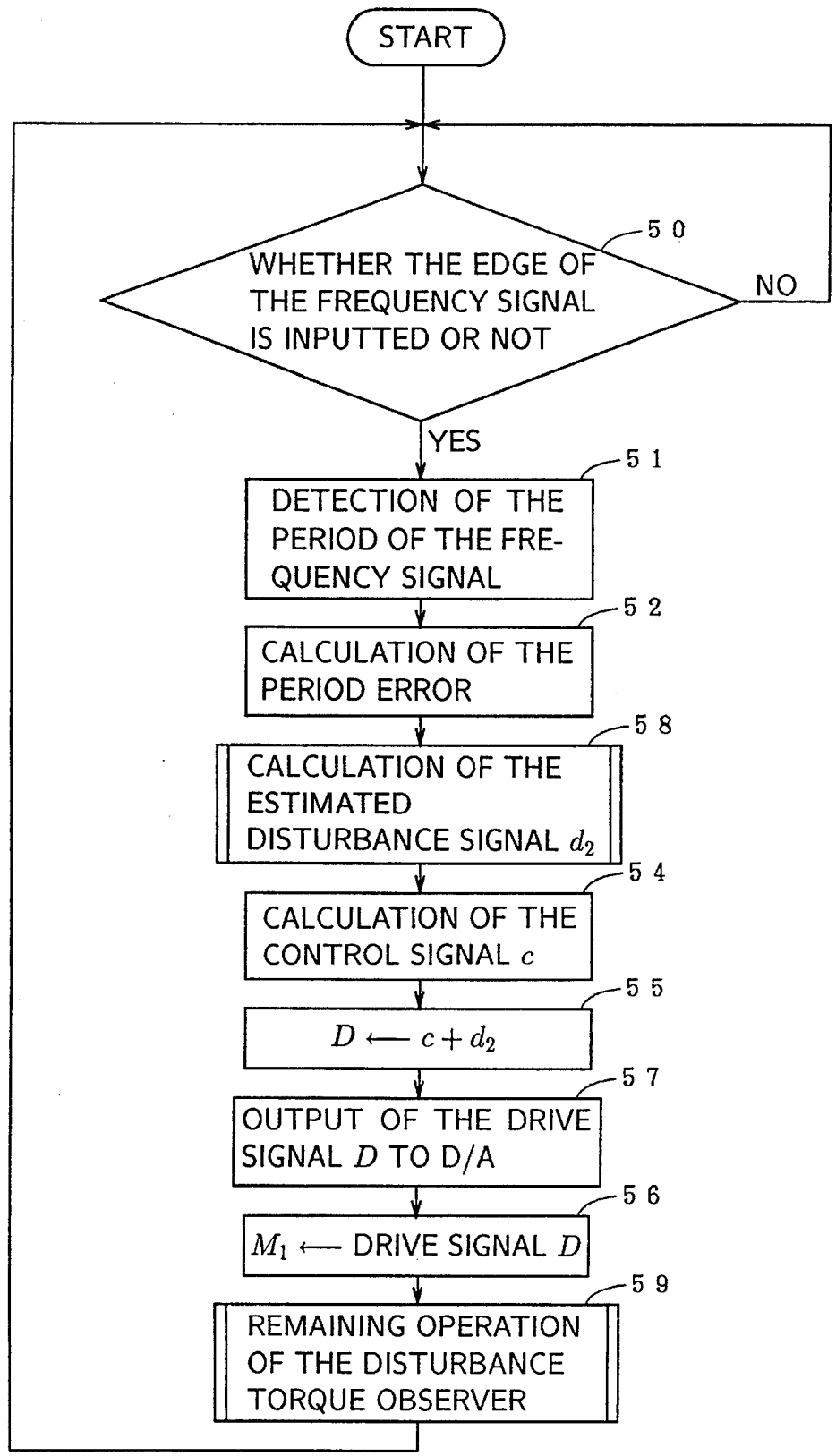
FIG. 5A is a flowchart illustrating the operation sequence of the fourth embodiment.
Figure 5B:
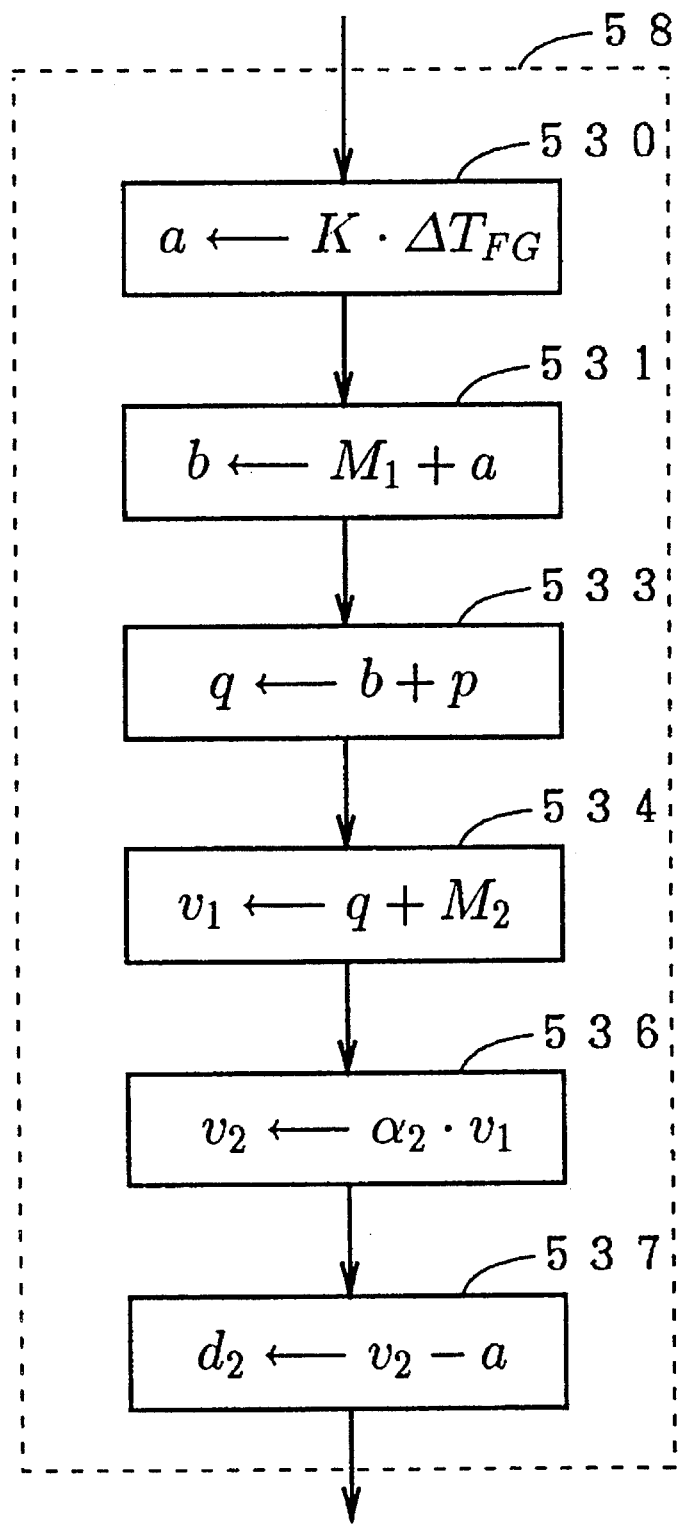
FIG. 5B is a detailed flowchart illustrating part of the operation sequence of the disturbance torque observer according to the fourth embodiment.
Figure 5C:
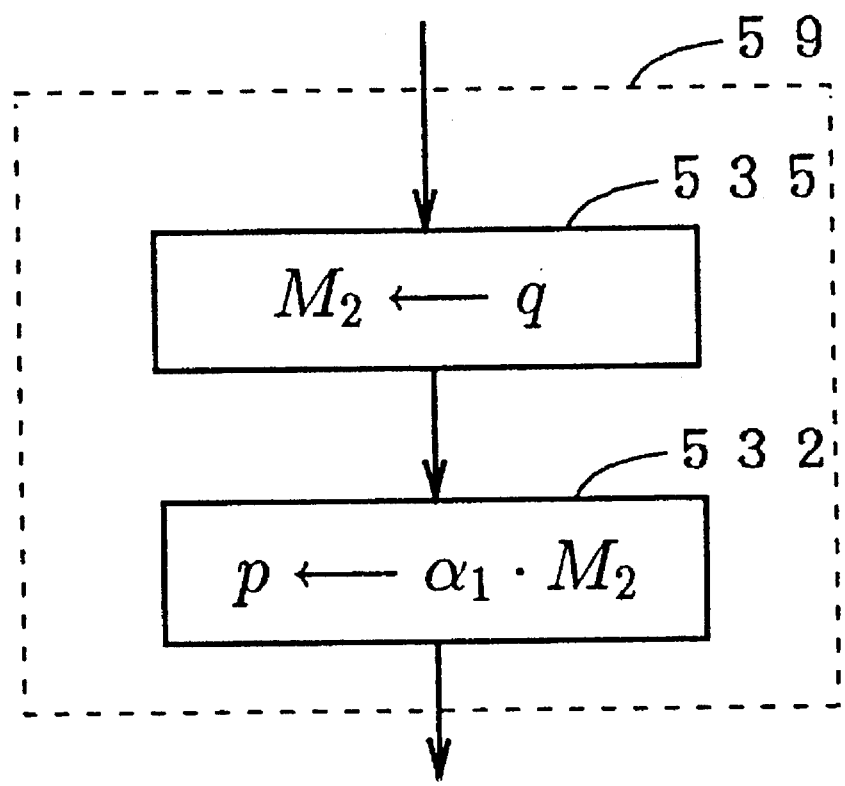
FIG. 5C is a flowchart illustrating the remaining part of the operation sequence of the disturbance torque observer according to the fourth embodiment.

FIG. 5A is a flowchart illustrating the operation sequence of the fourth embodiment, and FIG. 5B and FIG. 5C are detailed flowcharts illustrating the operation sequence of the disturbance torque observer 2 shown in FIG. 3. Since the configuration of the fourth embodiment is same as that of the third embodiment, a description of the configuration of the fourth embodiment has been omitted and only the operation sequence according to the fourth embodiment is described below.

In FIG. 5A, only the block 58 and the block 59 corresponding to the operation performed by the disturbance torque observer 2 shown in FIG. 3 are different from the blocks in FIG. 4A. Therefore, only these blocks are described below.

The block 58 calculates the estimated disturbance signal $d_2$ from both the period error $\Delta T_{FG}$ and the previously stored memory data $M_1$. The block 59 carries out the operation performed by the disturbance torque observer 2 which isn't carried out by the block 58.

The block 58 consists of six blocks as shown in FIG. 5B. Though each block is as mentioned above, the order of the operation sequence is different. At first, the block 530 calculates the distal data a which is the period error $\Delta T_{FG}$ multiplied by the constant K. This block 530 corresponds to the operation performed by the gain setting unit 11. The block 531 calculates the digital data b by adding the above mentioned memory data $M_1$ to the digital data a. This block 531 corresponds to the operation performed by the first adder 12. The block 533 calculates the digital data q by adding the digital data b to the digital data p which has been previously calculated. This block 533 corresponds to the operation performed by the adder 42. The block 534 calculates the digital data $v_1$ by adding the memory data $M_2$, which has been previously stored in memory, to the digital data q. This block 534 corresponds to the operation performed by the adder 44. The block 536 calculates the digital data $v_2$ which is the digital data $v_1$ multiplied by the constant $\alpha_2$. This block 536 corresponds to the operation performed by the gain setting unit 45. Lastly, the block 537 calculates the estimated disturbance signal $d_2$ by subtracting the digital data a from the digital data $v_2$. This block 537 corresponds to the operation performed by the second adder 13.

The block 59 consists of two blocks, namely the blocks 535 and 532. The block 535 stores the digital data q, which is calculated at the block 533, in the memory as the memory data $M_2$. This memory data $M_2$ is used at the block 534 when the next edge of the frequency signal FG is inputted. This block 535 corresponds to the operation performed by the delay unit 43 shown in FIG. 3. The block 532 calculates the digital data p by multiplying the memory data $M_2$, which is stored in memory at the previous block 535, by the constant $\alpha_2$. This block 532 corresponds to the operation performed by the gain setting unit 41.

In a software servo, the time lag due to the operation of the processor causes an inferior servo performance. Therefore, it is necessary to shorten this time lag as much as possible. This problem doesn't occur when using a high-performance processor. However, it becomes serious in using a processor whose operation speed isn't very fast, for example, a servo processor used in a home-use VCR.

In the operation sequence illustrated in FIG. 4A or FIG. 5A, this time lag is approximately equal to the time period from the time when the edge of the frequency signal is inputted until the time when the drive signal D is outputted to the D/A converter.

On the other hand, in the arithmetic operation of a processor, multiplication generally takes much longer than addition or subtraction.

Accordingly, in order to shorten the time lag due to the operation of the processor, it is important to reduce the number of multiplications carried out prior to the drive signal D being outputted.

The operation sequence according to the third embodiment shown in FIG. 4A needs three multiplications, which are carried out at the blocks 530, 532 and 536, before the drive signal D is outputted. Among these multiplications, the multiplication at the block 532 can be carried out after the output of the drive signal D. The operation sequence according to the fourth embodiment is so modified.

Therefore, according to the fourth embodiment, the inferiority of the servo performance due to the time lag is reduced, because the time lag becomes shorter. It goes without saying that the same effect that is obtained by the third embodiment can be obtained with respect to the suppression of the influence of the disturbance torque.

A fifth embodiment of this invention, which is another modification of the second embodiment for use with a software servo, is described below.

The configuration of the fifth embodiment is same as that of the second embodiment shown in FIG. 2A. As mentioned before, in using a software servo, the operations performed by the period detector 120, the comparator 130, the arithmetic unit 140, the correcting unit 10 and the disturbance torque observer 2 are realized by using a processor which operates according to a software program stored in memory.

Figure 6:
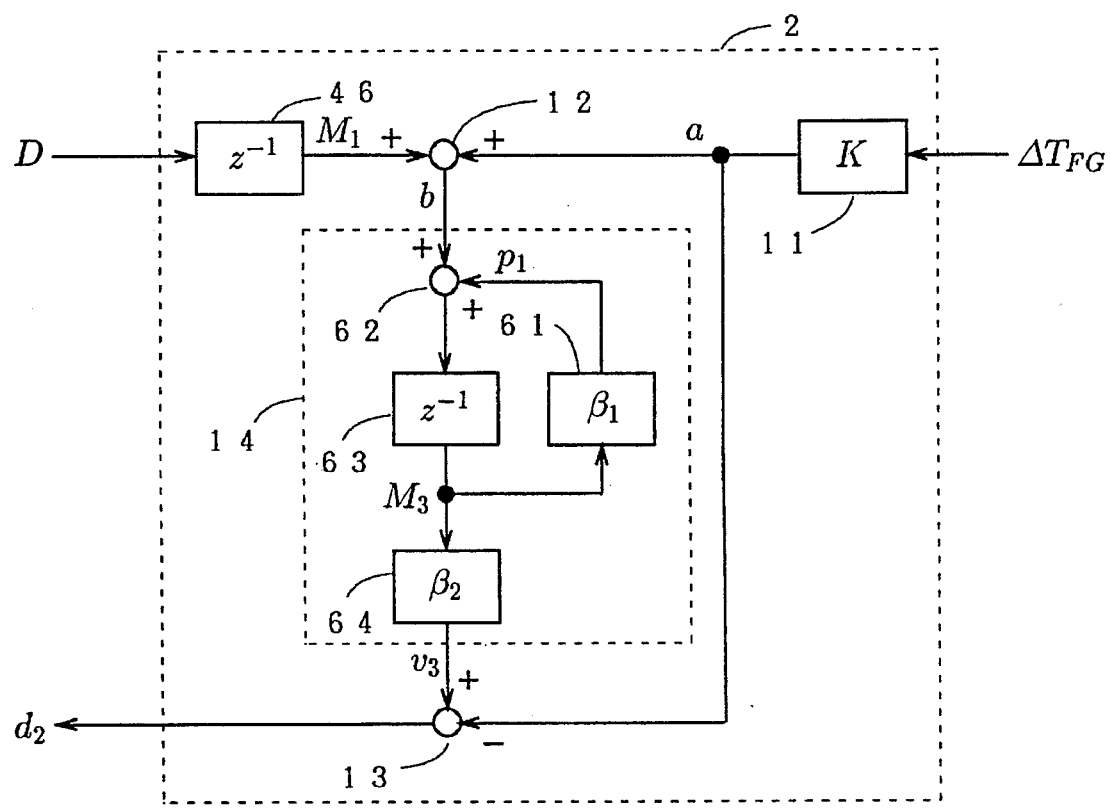
FIG. 6 is a block diagram of a disturbance torque observer according to a fifth embodiment of the present invention.

FIG. 6 is another block diagram of the disturbance torque observer 2 modified for use with a software servo, namely, in which the low-pass filter 14 is digitally emulated.

In FIG. 6, element 61 is a gain setting unit for setting a gain to a constant $\beta_1$; element 64 is a gain setting unit for setting a gain to a constant $\beta_2$; element 63 is a delay unit for providing a delay of one sampling time $T_s$. The transfer function $Q_2(z)$ of the low-pass filter 14 is given by the following equation:

$$Q_2(z) = \frac{\beta_2(1+z^{-1})}{1-\beta_1 z^{-1}} \quad (22)$$

where constants $\beta_1$ and $\beta_2$ are as follows using the sampling time $T_2$:

$$\beta_1 = 1 - w_o t_s \quad (23)$$

$$\beta_2 = w_o T_s \quad (24)$$

This transfer function $Q_2(z)$ is obtained by transforming the continuous transfer function of the first-order low-pass filter $Q(s) = w_o/(s+w_o)$ with an s–z transform as follows:

$$s = \frac{1}{T_s} \cdot \frac{1-z^{-1}}{z^{-1}} \quad (25)$$

Since this transform is well-known, a description thereof has been omitted.

Figure 7A:
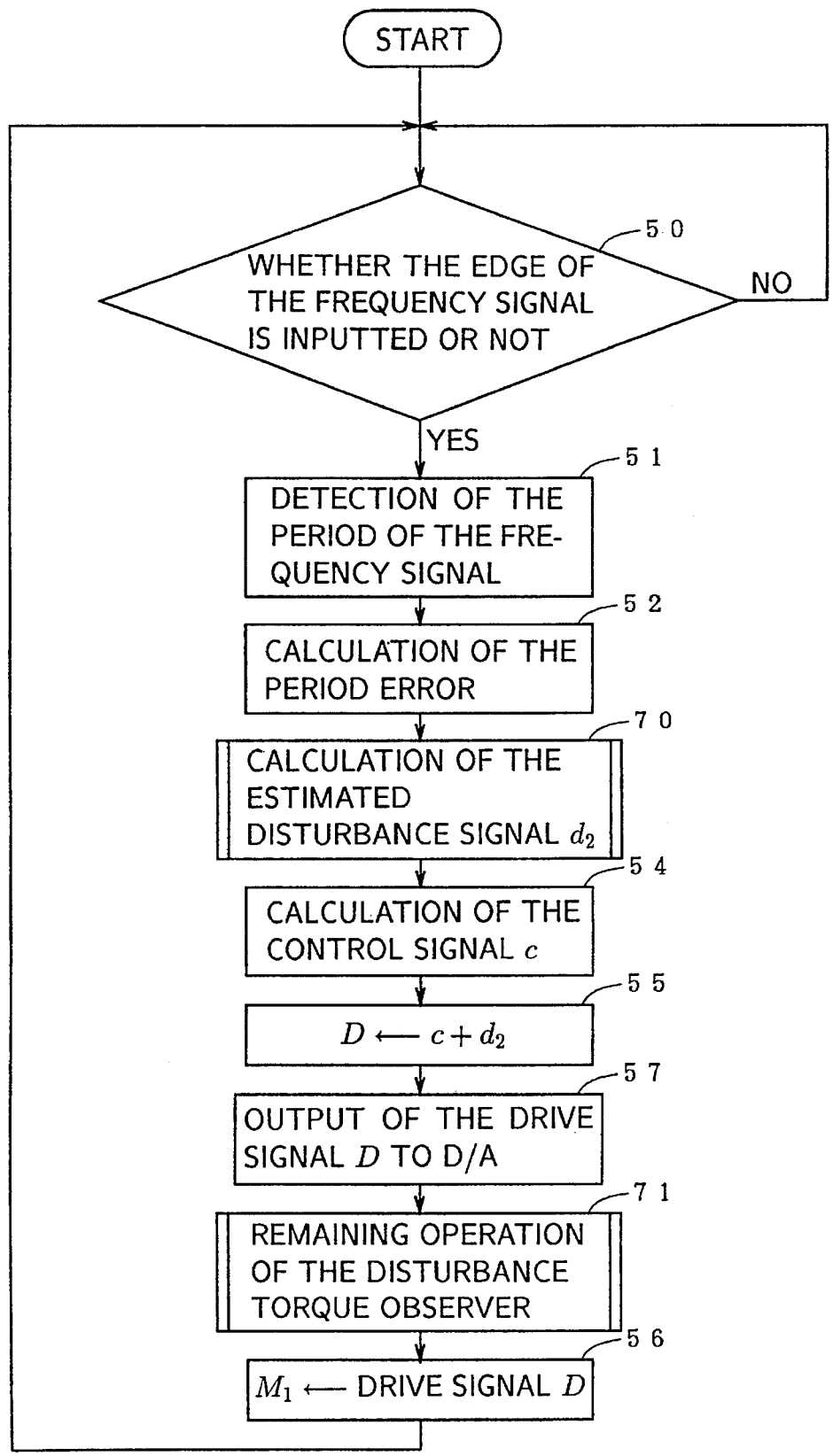
FIG. 7A is a flowchart illustrating the operation sequence of the fifth embodiment.
Figure 7B:
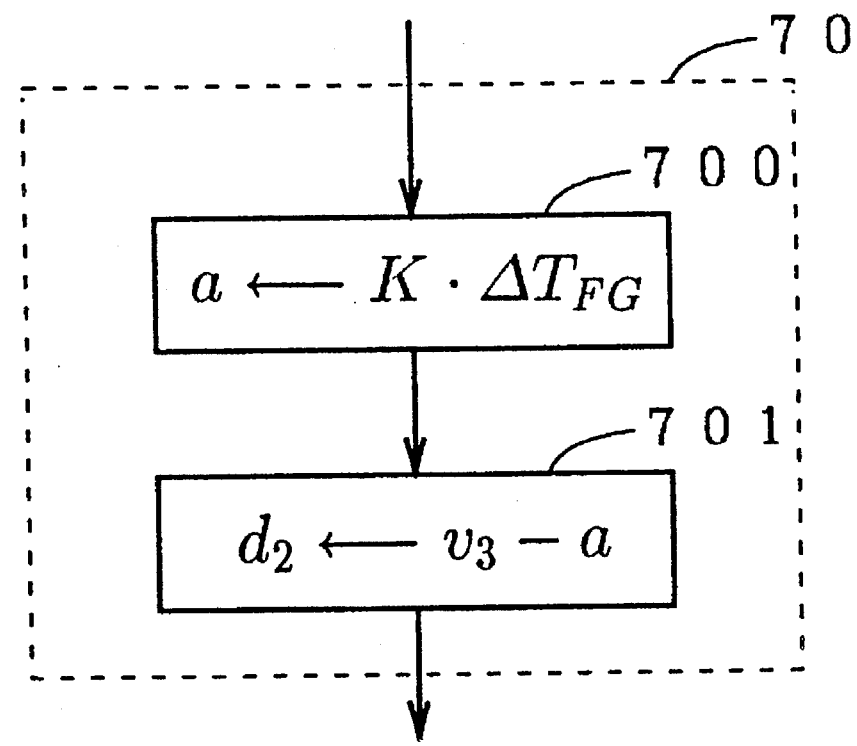
FIG. 7B is a detailed flowchart illustrating part of the operation sequence of the disturbance torque observer according to the fifth embodiment.
Figure 7C:
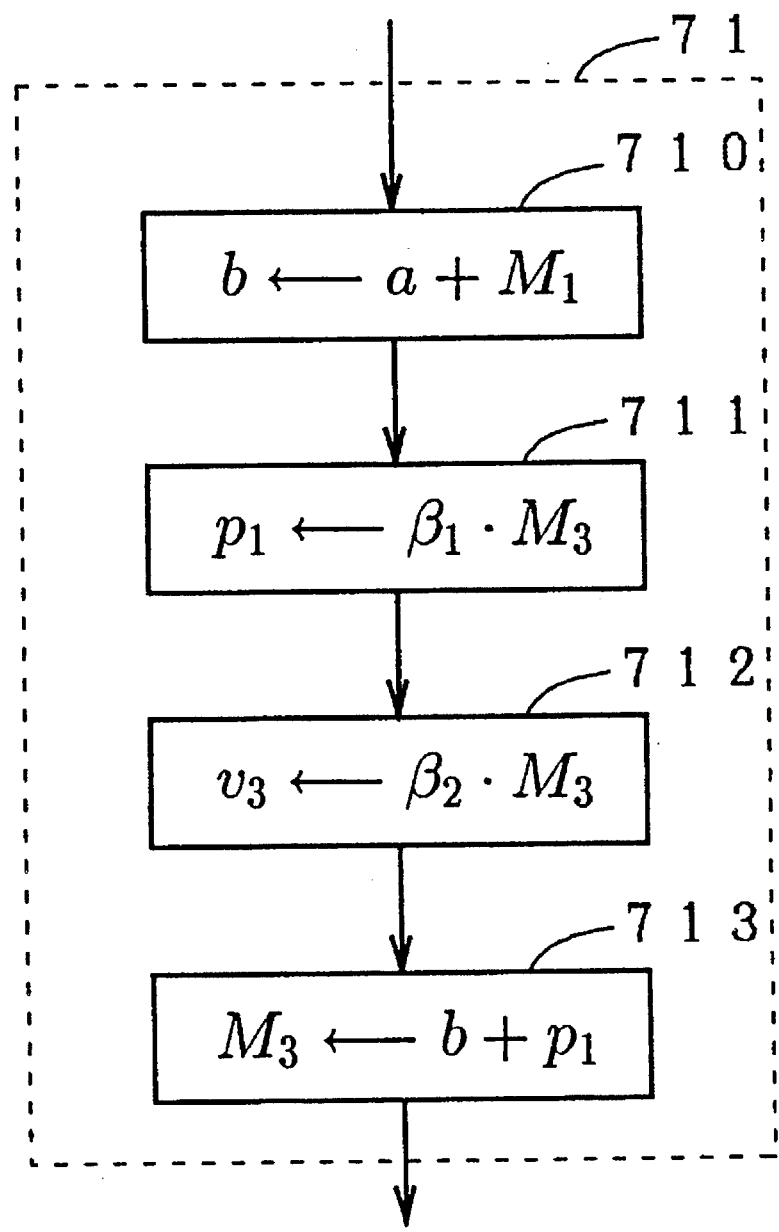
FIG. 7C is a flowchart illustrating the remaining part of the operation sequence of the disturbance torque observer according to the fifth embodiment.

FIG. 7A is a flowchart illustrating the operation sequence of the fifth embodiment. FIG. 7B and FIG. 7C are detailed flowcharts illustrating the operation sequence of the disturbance torque observer 2 shown in FIG. 6.

In FIG. 7A, only the block 70 and the block 71 corresponding to the operation performed by the disturbance torque observer 2 shown in FIG. 6 are different from the blocks in FIG. 4A. Therefore, only these blocks are described below.

The block 70 calculates the estimated disturbance signal $d_2$ from both the period error $\Delta T_{FG}$ and the previously stored memory data $M_1$. The block 71 carries out the operation performed by the disturbance torque observer 2 shown in FIG. 6 which isn't carried out at the block 70.

The block 70 consists of two blocks, namely the blocks 700–701, as shown in FIG. 7B. Firstly, the block 700 calculates the digital data a by multiplying the period error $\Delta T_{FG}$ by the constant K. This block 700 corresponds to the operation performed by the gain setting unit 11. Then, the block 701 calculates the estimated disturbance signal $d_2$ by subtracting the digital data a from the previously calculated digital data $v_3$. This block 701 corresponds to the operation performed by the second adder 13.

The block 71 consists of four blocks, namely the blocks 710–713, as shown in FIG. 7C. Firstly, the block 710 calculates the digital data b by adding the memory data $M_1$, which is previously stored in memory, to the digital data a. This block 710 corresponds to the operation performed by the first adder 12. The block 711 calculates the digital data $p_1$ by multiplying the memory data $M_3$, which has been previously stored in the memory, by the constant $\beta_1$. This block 711 corresponds to the operation performed by the gain setting unit 61. The block 712 calculates the digital data $v_3$ by multiplying the above mentioned memory data $M_3$ by the constant $\beta_2$. This block 712 corresponds to the operation performed by the gain setting unit 64 and this digital data $v_3$ is utilized by the block 701 when the next edge of the frequency signal FG is inputted. The block 713 adds the digital data b, which has been already calculated at the block 710, to the digital data $p_1$ and stores the result of this addition in memory as the memory data $M_3$. This memory data $M_3$ is used at the blocks 711–712 when the next edge of the frequency signal FG is inputted. This block 713 corresponds to the operation performed by the delay unit 63 shown in FIG. 6.

According to this operation sequence of the disturbance torque observer of the fifth embodiment, the process of calculating the estimated disturbance signal $d_2$ becomes much simpler in comparison with that of the fourth embodiment. Although two multiplications are necessary prior to the outputting of the estimated disturbance signal $d_2$ in the operation sequence of the fourth embodiment, only one multiplication is needed in the operation sequence of this fifth embodiment.

According to the fifth embodiment, since tile time lag due to the operation of the processor is shortened, the inferior servo performance caused by the time lag is reduced.

The following is a description of a sixth embodiment of this invention, which is a modification of the fifth embodiment for reducing the inferiority of the servo performance caused by the operation time lag to a greater degree.

Figure 8:
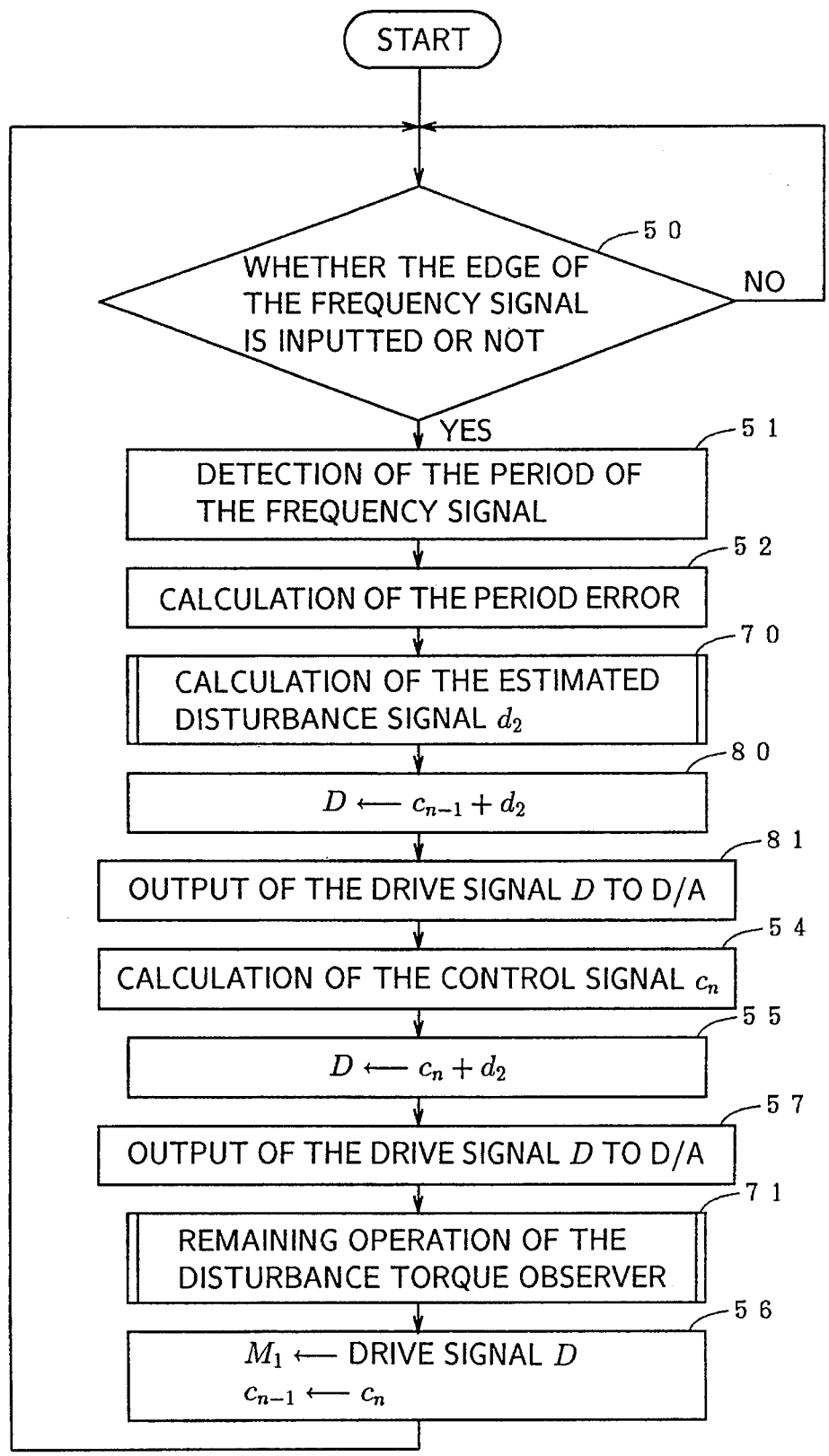
FIG. 8 is a flowchart illustrating the operation sequence of a sixth embodiment of the present invention.

FIG. 8 is a flowchart illustrating tile operation sequence of the sixth embodiment. The configuration of the sixth embodiment is same as that of the fifth embodiment.

In FIG. 8, the blocks 80–81 are added to the operation sequence shown in FIG. 7A. and the other blocks are same as the blocks shown in FIG. 7A, FIG. 7B and FIG. 7C.

At first, the estimated disturbance signal $d_2$ is calculated through the blocks 50, 51, 52 and 70. The operation of these blocks has been already described. Next, at the block 80, the first torque correction is carried out by adding the estimated disturbance signal $d_2$ to the control signal c, which has been previously calculated and called $c_{n-1}$ below, and the result is outputted as the drive signal D. This block 80 corresponds to the operation performed by the torque correcting unit 10. At the block 81, the drive signal D is provided to the D/A converter. The D/A converter immediately supplies the drive circuit 150 with voltage according to this drive signal D.

Then, at the block 54, the control signal c, which is called $c_n$ below, is calculated. At the block 55, the second torque correction is carried out by adding the estimated disturbance signal $d_2$ to the control signal $c_n$ and the result is outputted as the drive signal D. This block 55 also corresponds to the torque correcting unit 10. At the block 56, the drive signal D calculated at the block 55 and the control signal $c_n$ calculated at the block 54 are respectively stored in memory as the memory data $M_1$ and the control signal $c_{n-1}$. Lastly, at the block 57, the drive signal D calculated at the block 55 is again provided to the D/A converter. The D/A converter immediately supplies the drive circuit 150 with a voltage according to this drive signal D. After the operation of the block 57, the operation returns to the block 50. The above operations are carried out repeatedly while being synchronized with the frequency signal FG.

On the other hand, The drive circuit 150 supplies the drive current $I_a$ to the motor 100 according to the voltage input thereto. As the result, the speed of the motor 100 is controlled so as to reduce the period error to zero and is kept fixed.

According to the above-mentioned operation sequence of the third, the fourth and the fifth embodiment, there is a time lag between the time when the calculation of the estimated disturbance signal $d_2$ has finished and the time when the torque correction of the control signal c is carried out. In other words, the operation time for the calculation of the control signal c at the block 54 becomes the time lag. This time lag causes an inferior servo performance, if it cannot be neglected in comparison with the sampling period.

However, the operation sequence of the sixth embodiment of this invention is contrived so as not cause this time lag. In other words, in the operation sequence of the sixth embodiment, the first torque correction is carried out at the block 80 immediately after the calculation of the estimated disturbance $d_2$ and the drive signal D is outputted. Then, the second torque correction is carried out at the block 55 after the calculation of the control signal $c_n$ and the drive signal D is outputted again. As the result, according to the sixth embodiment of this invention, there is no inferiority of the servo performance due to the said time lag even though the operation time for the calculation of the control signal c isn't negligible.

A seventh embodiment of this invention, which is a modification of the third embodiment, is described below. In this embodiment, the servo performance when the motor is started up is also considered.

Figure 9:
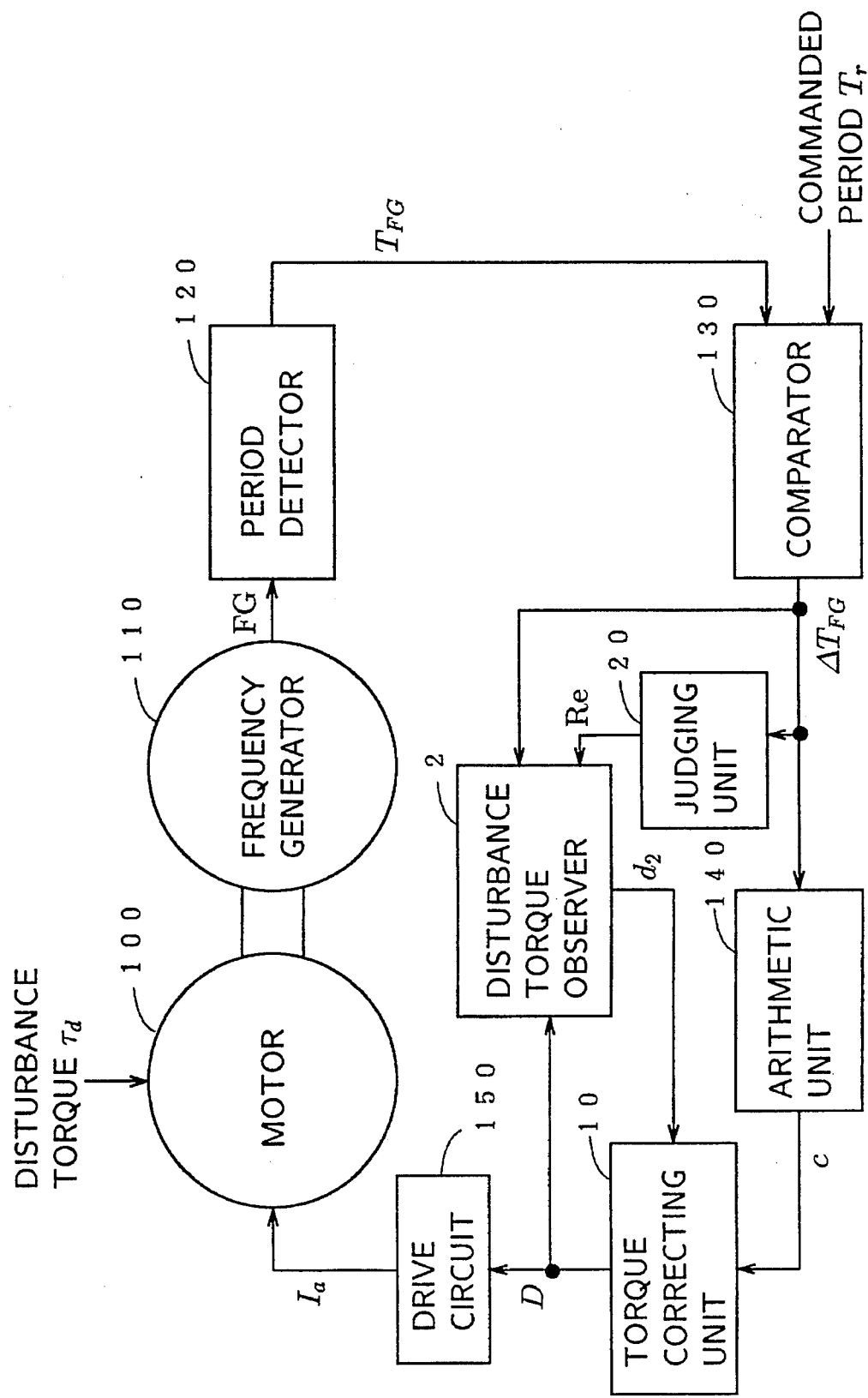
FIG. 9 is a schematic block diagram of a seventh embodiment of a motor control apparatus according to the present invention.

FIG. 9 shows the seventh embodiment of this invention. In FIG. 9, the judging unit 20 is added to the configuration shown in FIG. 2A. The judging unit 20 judges the magnitude of the period error $\Delta T_{FG}$ and provide the disturbance torque observer 2 with the reset signal Re according to the result of the judgement. Furthermore, the disturbance torque observer 2 shown in FIG. 9 has the same configuration as that shown in FIG. 3, and the other elements are sanhe as those shown in FIG. 2A.

Figure 10A:
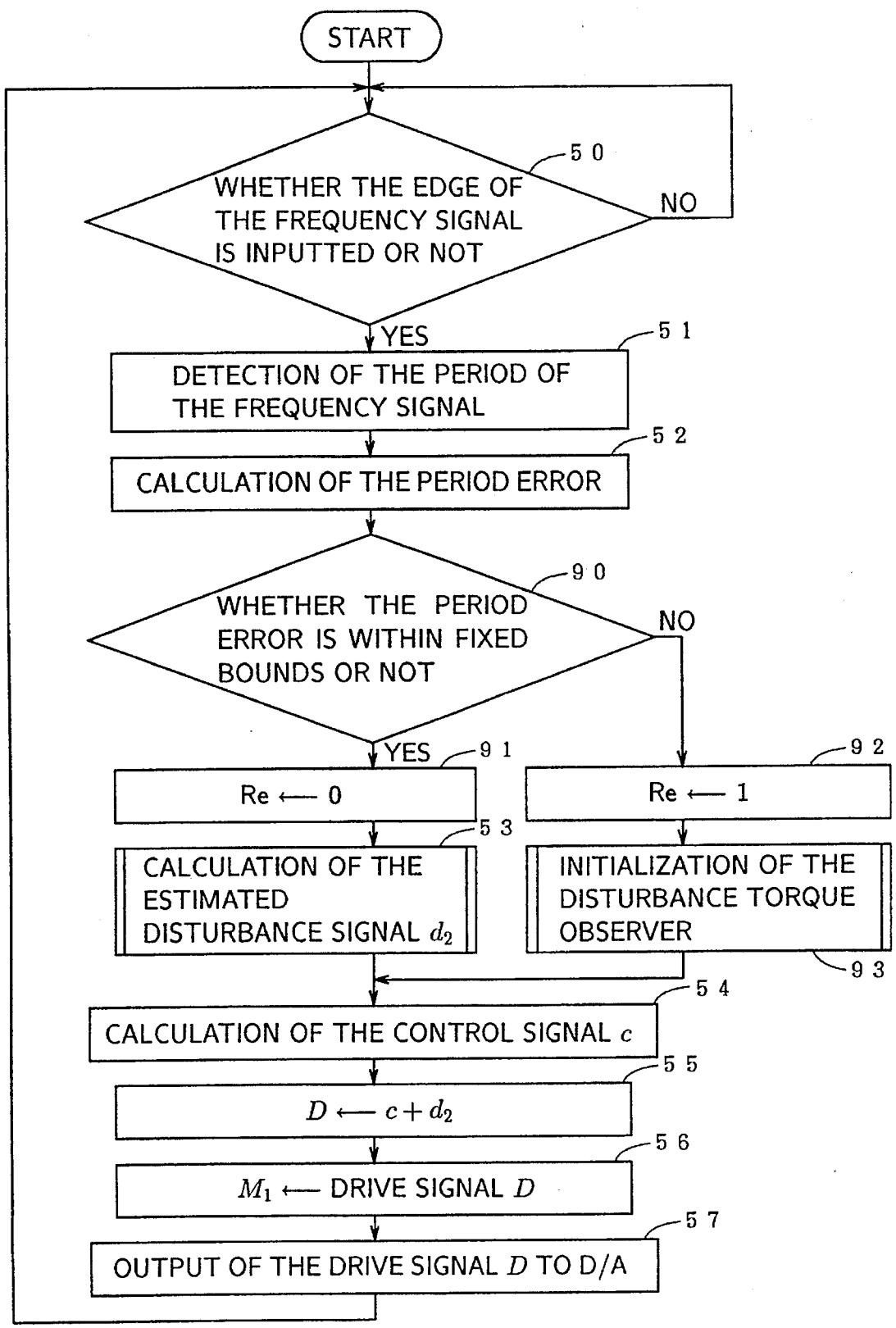
FIG. 10A is a flowchart illustrating the operation sequence of the seventh embodiment.
Figure 10B:
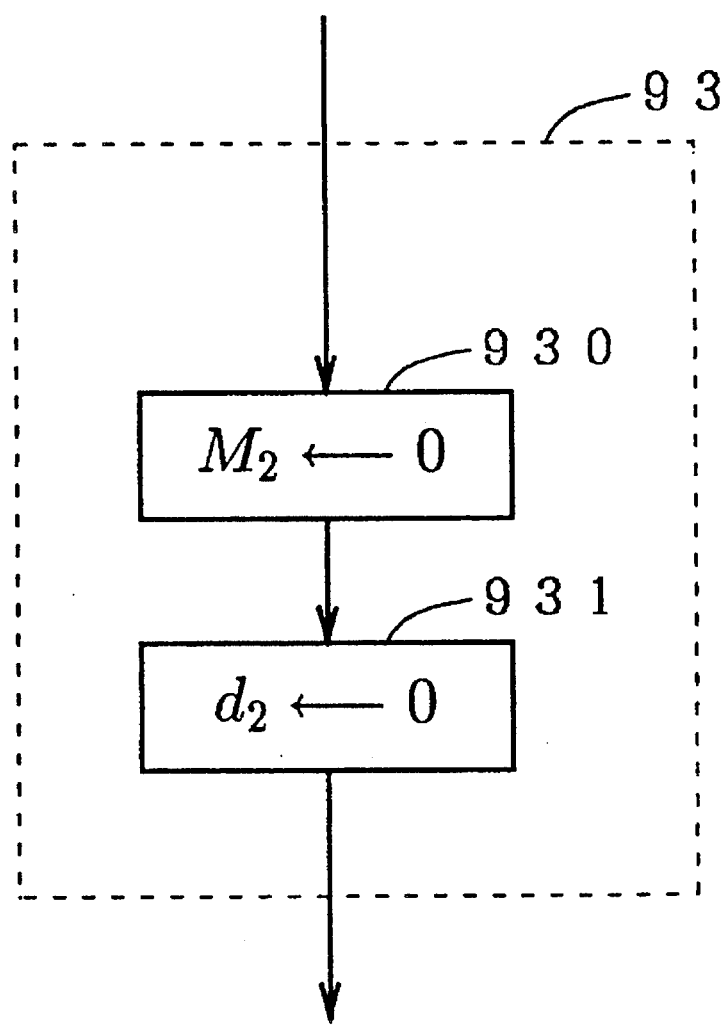
FIG. 10B is a flowchart illustrating the operation sequence of the disturbance torque observer according to the seventh embodiment when a period error is out of fixed bounds.

FIG. 10A is a flowchart illustrating the operation sequence of the seventh embodiment, and FIG. 10B is a flowchart illustrating the operation sequence for initializing the process of the disturbance torque observer 2 shown in FIG. 3.

Consider first the case when the motor 100 is stopped and then will be started up. In this case, at first, the voltage corresponding to the start-up torque required for starting up the motor 100 is outputted by the processor through the D/A converter. The voltage is provided to the drive circuit 150. The drive circuit 150 supplies the motor 100 with the drive current $I_a$ according to said voltage, and then the motor 100 starts rotating. After the motor 100 is started up, the frequency generator 110 generates the frequency signal FG whose frequency is in proportion to the speed of the motor. The frequency signal FG is inputted to the processor and the operation sequence shown in FIG. 10A is carried out.

In the operation sequence shown in FIG. 10A, the blocks 90-93 have been added to the operation sequence shown in FIG. 4A. Since the other blocks have already been described, a description thereof has been omitted.

At the block 90, a determination is made as to whether, or not the magnitude of the period error $\Delta T_{FG}$ is within fixed bounds. If the magnitude is within fixed bounds, the reset signal Re is set to a low level at the block 91, and if not, the reset signal Re is set to high level at the block 92. Generally, the fixed bounds are set to about 5% of the desired period $T_r$. These bounds are satisfied immediately after the motor is started up even in a conventional motor control apparatus such as that shown in FIG. 11.

When the reset signal Re is set to a low level, the operation sequence shown in FIG. 10A is the same as that shown in FIG. 4. Therefore, the operation sequence, which is carried out when the reset signal Re is set to a high level, is described as follows.

When the reset signal Re is set to a high level, the speed of the motor 100 isn't in a static condition. Accordingly, the disturbance torque observer 2 cannot estimate the disturbance torque accurately, because the differential equation between the time-domain function y(t) of the speed w of the motor 100 and the time-domain function x(t) of the period $T_{FG}$ of the frequency signal FG, which is given by Eq. (5), isn't satisfied. For this reason, at the block 93, the process of the disturbance torque observer 2 is initialized.

As shown in FIG. 10B, the block 93 consists of two blocks 930 and 931. At the block 930, the memory data $M_1$, which has been previously stored in memory, is set to zero. At the block 931, the estimated disturbance signal $d_2$ is also set to zero.

After these operations for the initialization, the operations of the blocks 54-57 are carried out. However, at the block 55, the torque correction isn't carried out substantially, because the estimated disturbance signal $d_2$ has been set to zero at the block 931.

As mentioned above, in the seventh embodiment of this invention, the torque correction isn't carried out substantially, when the period error $\Delta T_{FG}$ is beyond the fixed bounds. Therefore, according to this embodiment, the motor is started up smoothly, because the torque correction in accordance with an inaccurate estimated disturbance signal can be prevented. After the motor has been started up and its speed reaches a static condition, the effect of the disturbance suppression, which is represented by Eq. (10), can be obtained.

In the description of each embodiment of this invention, only the speed control has been described. However, it is easy to add means for controlling the rotational phase of the motor to each embodiment with conventional technology. Although the drive signal D, which is outputted by the torque correcting unit 10, is inputted to the disturbance torque observer 1 or 2, the drive current $I_a$, which is supplied to the motor 100, can be used instead of the drive signal D.

In the description of the second, the third, the fourth, the fifth, the sixth and the seventh embodiments of this invention, the period error $\Delta T_{FG}$ is inputted to the disturbance torque observer 2. However, the detected period $T_{FG}$, which is outputted by the period detector 120, can be used as a substitute for the period error $\Delta T_{FG}$. Moreover, instead of the detected period $T_{FG}$, any signal can be used so long as it substantially corresponds to the period of the frequency signal FG.

The third, the fourth, the fifth, the sixth and the seventh embodiments of this invention are described with respect to the case of using a software servo. But of course, these embodiments can also be realized with hardware.

Furthermore, in the fourth, the fifth, the sixth and the seventh embodiment, a detected velocity signal of the motor 100 or an error signal in speed can be used as the input signal of the disturbance torque observer 2 instead of the period error $\Delta T_{FG}$.

In addition to these modifications, various modifications are possible as long as the purpose of this invention isn't changed.

What is claimed is:

1. A motor control apparatus for keeping the speed of a motor fixed in the presence of a disturbance torque according to a period of a frequency signal, comprising:

a frequency generator for generating a frequency signal whose frequency is in proportion to the speed of the motor;

a period detector for detecting the period of said frequency signal;

a comparator for producing a period error signal corresponding to a difference between a desired period and a detected period sinal from said period detector;

an arithmetic unit for calculating a control signal in accordance with said period error signal;

a motor drive circuit for supplying the motor with electric power according to a drive signal;

a disturbance torque observer for producing an estimated disturbance torque signal from said detected period signal and said drive signal, said estimated disturbance torque signal being a conversion of the disturbance torque applied to the motor into an electrical signal and;

a torque correcting unit for producing said drive signal by adding said control signal to said estimated disturbance torque signal.

2. A motor control apparatus according to claim 1, wherein said disturbance torque observer comprises:

a means for multiplying said detected period signal by a fixed coefficient;

a means for subtracting an output of said means for multiplying from said drive signal;

a low-pass filter for low-pass filtering an output of said means for subtracting; and a means for calculating said estimated disturbance torque signal by adding an output of said means for multiplying to an output of said low-pass filter.

3. A motor control apparatus according to claim 2, wherein said disturbance torque observer operates according to a software program which is synchronized with said frequency signal.

4. A motor control apparatus according to claim 2, wherein said low-pass filter has a transfer function of $\alpha_2(1+z^{-1})/(1-\alpha_1 z^{-1})$ where $z^{-1}$ is a delay unit of one sampling time and $\alpha_1$ and $\alpha_2$ represent constants for determining a cut-off frequency of said low-pass filter.

5. A motor control apparatus according to claim 4, wherein a portion of said low-pass filter operation is carried out after said disturbance torque observer has outputted said estimated disturbance torque signal.

6. A motor control apparatus according to claim 2, wherein said low-pass filter has a transfer function of $\beta_2 z^{-1}/(1-\beta_1 z^{-1})$ where $z^{-1}$ is a delay unit of one sampling time and $\beta_1$ and $\beta_2$ represent constants for determining a cut-off frequency of said low-pass filter.

7. A motor control apparatus according to claim 6, wherein a portion of said lowpass filter operation and said means for subtracting operation are carried out after said disturbance torque observer has outputted said estimated disturbance torque signal.

8. A motor control apparatus according to claim 2, wherein said arithmetic unit and said torque correcting unit operate according to a software program which is synchronized with said frequency signal, and said torque correcting unit carries out a first torque correction immediately after said disturbance torque observer has outputted said estimated disturbance torque signal, and carries out a second torque correction immediately after said arithmetic unit has outputted said control signal.

9. A motor control apparatus for keeping the speed of a motor fixed in the presence of a disturbance torque according to a period of a frequency signal, comprising:

a frequency generator for generating a frequency signal whose frequency is in proportion to the speed of the motor;

a period detector for detecting the period of said frequency signal;

a comparator for producing a period error signal which is a difference between a desired period and a detected period sinal from said period detector;

an arithmetic unit for calculating a control signal in accordance with said period error signal;

a motor drive circuit for supplying the motor with electric power according to a drive signal;

a disturbance torque observer for producing an estimated disturbance torque signal from said detected period signal and said drive signal, said estimated disturbance torque signal being a conversion of the disturbance torque applied to the motor into an electrical signal; and a torque correcting unit for producing said drive signal by adding said control signal to said estimated disturbance torque signal.

10. A motor control apparatus according to claim 9, wherein said disturbance torque observer comprises:

a means for multiplying said period error signal by a fixed coefficient;

a means for adding an output of said means for multiplying to said drive signal;

low-pass filter for low-pass filtering an output of said means for adding; and a means for calculating said estimated disturbance torque signal by subtracting an output of said means for multiplying from an output of said low-pass filter.

11. A motor control apparatus according to claim 10, wherein said disturbance torque observer operates according to a software program which is synchronized with said frequency signal.

12. A motor control apparatus according to claim 10, wherein said low-pass filter has a transfer function of $\alpha_2 (1+z^{-1})/(1-\alpha_1 z^{-1})$ where $z^{-1}$ is a delay unit of one sampling time and $\alpha_1$ and $\alpha_2$ represent constants for determining a cut-off frequency of said low-pass filter.

13. A motor control apparatus according to claim 12, wherein a portion of said low-pass filter operation is carried out after said disturbance torque observer has outputted said estimated disturbance torque signal.

14. A motor control apparatus according to claim 10, wherein said low-pass filter has a transfer function of $\beta_2 z^{-1}/(1-\beta_1 z^{-1})$ where $z^{-1}$ is a delay unit of one sampling time and $\beta_1$ and $\beta_2$ represent constants for determining a cut-off frequency of said low-pass filter.

15. A motor control apparatus according to claim 14, wherein a portion of said low-pass filter operation and said means for adding operation are carried out after said disturbance torque observer has outputted said estimated disturbance torque signal.

16. A motor control apparatus according to claim 10, wherein said arithmetic unit and said torque correcting unit operate according to a software program which is synchronized with said frequency signal, and said torque correcting unit carries out a first torque correction immediately after said disturbance torque observer has outputted said estimated disturbance torque signal, and carries out a second torque correction immediately after said arithmetic unit has outputted said control signal.

17. A motor control apparatus according to any one of claims 1–16, further comprising a judging unit for determining whether or not a magnitude of said period error signal is within fixed bounds, wherein said torque correcting unit is inhibited from adding said estimated disturbance torque signal to said control signal when said judging unit has determined that the magnitude of said period error signal is out of said fixed bounds.

* * * * *